No. 721,352. PATENTED FEB. 24, 1903.
J. APPLIN.
NUT LOCK.
APPLICATION FILED FEB. 4, 1902.
NO MODEL.
FIG. I.
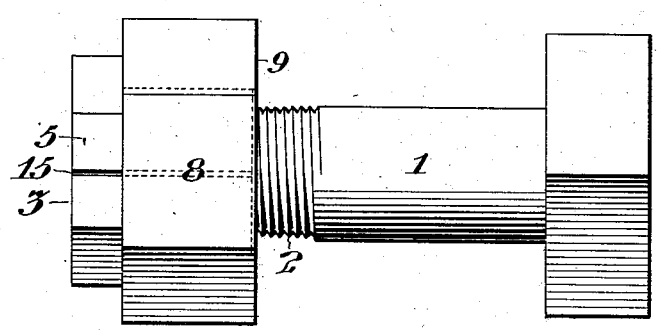
FIG. II.
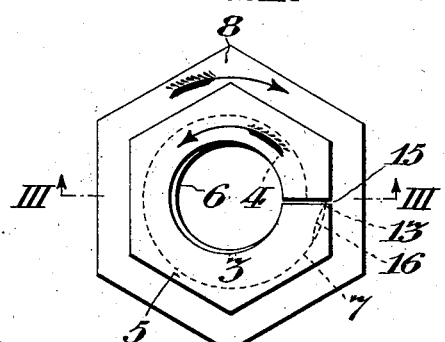
FIG. IV.
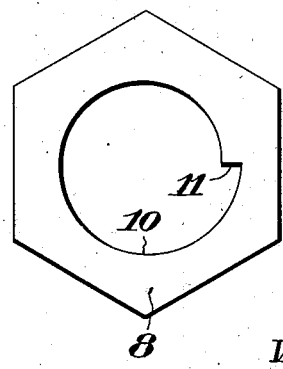
FIG. V.
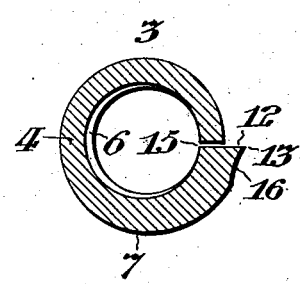
FIG. III.
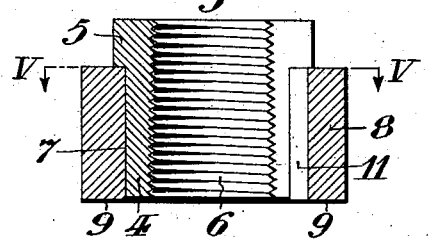
WITNESSES:
Clifton C. Hallowell
Edward Rittenhouse
INVENTOR:
JOSEPH APPLIN,
by Arthur E. Paige
Atty.

UNITED STATES PATENT OFFICE.

JOSEPH APPLIN, OF PHILADELPHIA, PENNSYLVANIA.

NUT-LOCK.

SPECIFICATION forming part of Letters Patent No. 721,352, dated February 24, 1903.

Application filed February 4, 1902. Serial No. 92,520. (No model.)

*To all whom it may concern:*

Be it known that I, JOSEPH APPLIN, of Philadelphia, Pennsylvania, have invented certain new and useful Improvements in Nut-Locks, whereof the following is a specification, reference being had to the accompanying drawings.

My invention comprises the combination, with a split nut having screw-threads on its interior surface and an exterior cam-surface, of a rotatable cam-ring mounted on said nut and having an interior cam-surface arranged to work against said cam-surface of the nut, the relation of the parts being such that partial rotation of said cam-ring upon the nut in one direction contracts the nut to lock it upon the bolt and reverse rotation of said cam-ring permits the nut to expand to its normal diameter to release the bolt.

As hereinafter described, the nut-cam is provided with a cutting edge to engage the cam-ring; and it is to be understood that my invention comprehends the various novel features of construction and arrangement hereinafter described.

In the accompanying drawings, Figure I is a side elevation of a bolt and a convenient embodiment of my invention applied thereto. Fig. II is an end view of the nut and cam-ring shown in Fig. I. Fig. III is a sectional view taken on the line III III in Fig. II. Fig. IV is an end view of said cam-ring. Fig. V is a sectional view of the nut, taken on the line V V in Fig. III.

Referring to the drawings, 1 is a bolt, on the screw-threaded portion 2 of which is mounted the split nut 3, comprising the sleeve or bushing 4 and the hexagonal head 5. Said nut is provided with the interiorly-screw-threaded surface 6 and the exterior involute curved cam-surface 7.

On the nut-bushing 3 is rotatably mounted the cam-ring 8, which is of such thickness that the inner end 9 thereof projects beyond the inner end of the nut, as indicated in Fig. III. Said cam-rim is provided with the interior involute curved cam-surface 10, arranged to work against the involute curved cam-surface 7 of the nut.

The arrangement of the parts above described is such that when the cam-ring 8 is mounted upon the nut 3 the latter may be screwed upon the bolt 1 by rotation of the cam-ring 8 to the right, as indicated by the arrow on said ring in Fig. II, with the same facility as if the nut and cam-ring were in integral relation, the abutment 11 of the cam-ring being positively engaged with the abutment 12 of the nut. The nut being seated in the desired position, with the inner end 9 of the cam-ring 8 pressed against the surface of the article which is to be held by the bolt, accidental rotation of the cam-ring is prevented by its frictional engagement between said surface and the head 5 of the nut. However, it being desired to lock the nut upon the bolt, the nut is held stationary conveniently by a wrench and the cam-ring reversely rotated thereon, with the result that the relative movement of the cam-surfaces contracts the diameter of the nut and locks the latter upon the bolt.

Although the nut is securely locked by the operation above described, it may be instantly released by restoring the nut and cam-ring to their original relation. Such restoration may be conveniently effected by reverse rotation of the nut, as indicated by the arrow on it in Fig. II.

Although I have found that the mere frictional engagement of the parts serves to prevent accidental release of the nut, I prefer to provide the nut with a cutting edge 13, which is adapted to engage the interior cam-surface of the cam-ring 8 in any position of rotation.

It is to be noted that the cam-ring is of such construction that it may be punched by ordinary methods from sheet metal. I find it convenient to form the nuts of drop-forgings, which are threaded and subsequently split by a saw-cut at the point 15. (Indicated in Fig. V.)

In order to harden the cutting edge 13, I find it convenient to remove the scale from the outer surface of the nut-bushing by filing or grinding the latter immediately adjoining said edge 13, as indicated at 16, in Fig. V.

It is to be understood that I do not desire to limit myself to the precise details of construction and arrangement herein set forth, as it is obvious that various modifications may be made therein without departing from the essential features of my invention.

I claim—

1. In a nut-lock, the combination with a split nut having screw-threads on its interior surface, and an exterior cam-surface; of a cam-ring on said nut having an interior cam-surface; said cam-ring being arranged to be rotated on said nut to contract the diameter thereof, and, to allow said nut to expand to its normal diameter, the smallest diameter of said cam-ring being larger than the screw-threads on said nut, substantially as set forth.

2. In a nut-lock, the combination with a split nut provided with screw-threads on its interior surface, an exterior cam-surface and a head; of a cam-ring on said nut, having an interior cam-surface; the head of said nut being arranged to bear against said cam-ring; said cam-ring being arranged to be rotated on said nut to contract the diameter thereof, and, to allow said nut to expand to its normal diameter, the smallest diameter of said cam-ring being larger than the screw-threads on said nut, substantially as set forth.

3. In a nut-lock, the combination with a split nut having screw-threads on its interior surface, and an exterior cam-surface; of a cam-ring on said nut projecting beyond the inner end thereof, and having an interior cam-surface; said cam-ring being arranged to be rotated on said nut to contract the diameter thereof, and, to allow said nut to expand to its normal diameter, the smallest diameter of said cam-ring being larger than the screw-threads on said nut, substantially as set forth.

4. In a nut-lock, the combination with a split nut having screw-threads on its interior surface, and an exterior involute cam-surface; of a cam-ring on said nut having an interior involute cam-surface; said cam-ring being arranged to be rotated on said nut to contract the diameter thereof, and, to allow said nut to expand to its normal diameter, the smallest diameter of said cam-ring being larger than the screw-threads on said nut, substantially as set forth.

5. In a nut-lock, the combination with a split nut provided with screw-threads on its interior surface, an exterior involute cam-surface and a head; of a cam-ring on said nut projecting beyond the inner end thereof, and having an interior involute cam-surface; the head of said nut being arranged to bear against said cam-ring; said cam-ring being arranged to be rotated on said nut to contract the diameter thereof, and, to allow said nut to expand to its normal diameter, the smallest diameter of said cam-ring being larger than the screw-threads on said nut, substantially as set forth.

6. In a nut-lock, the combination with a split nut having screw-threads on its interior surface, an exterior involute cam-surface and a cutting edge at the greatest radius of said cam-surface; of a cam-ring on said nut having an interior involute cam-surface; said cam-ring being arranged to be rotated on said nut to contract the diameter thereof, and, to allow said nut to expand to its normal diameter, the smallest diameter of said cam-ring being larger than the screw-threads on said nut, substantially as set forth.

7. In a nut-lock, the combination with a split nut having screw-threads on its interior surface and an exterior cam-surface; of a cam-ring having an interior cam-surface, fitted to the cam-surface of said nut; said cam-ring being arranged to be rotated on said nut independent of the bolt upon which said nut is mounted, substantially as set forth.

In testimony whereof I have hereunto signed my name, at Philadelphia, Pennsylvania, this 1st day of February, 1902.

JOSEPH APPLIN.

Witnesses:
ARTHUR E. PAIGE,
MILDRED BARNHART.